Dec. 18, 1928.　　　　　　　　　　　　　　　　　　　1,695,832
H. H. WEBER
EGG BOILER
Filed Feb. 29, 1928
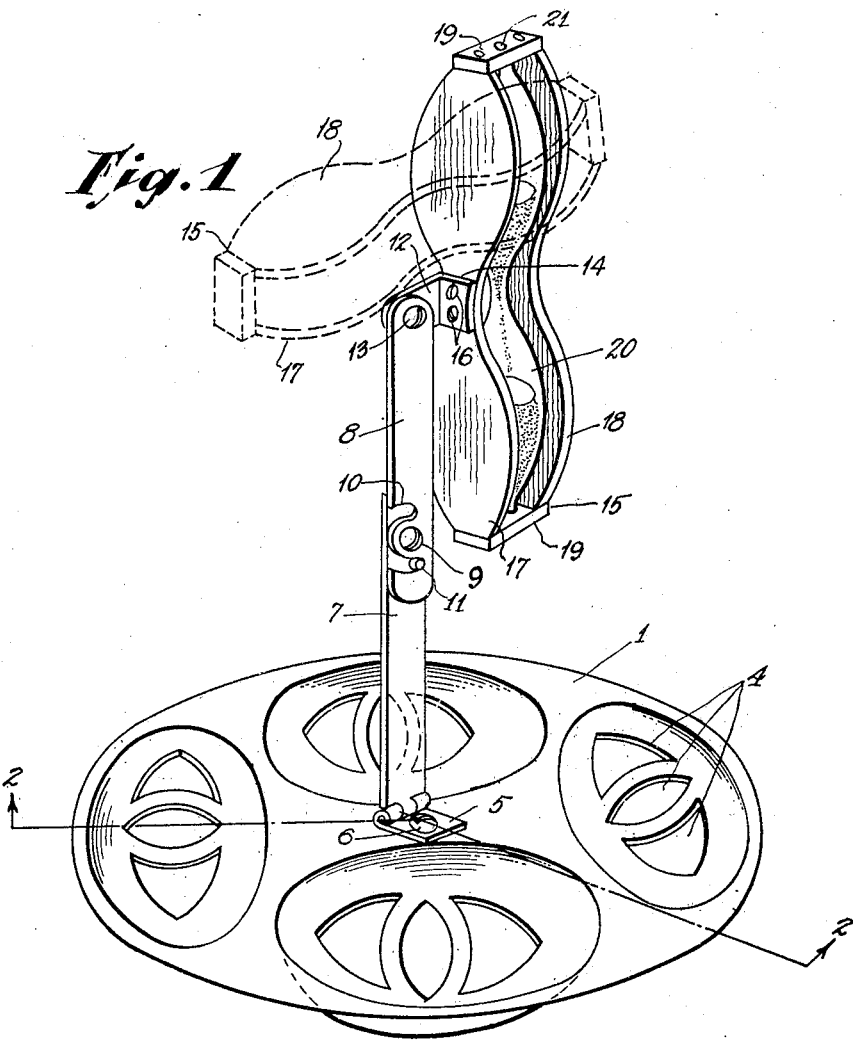
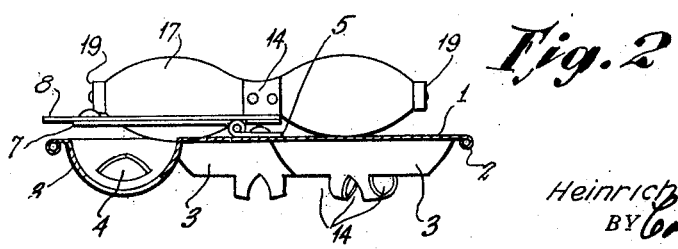
INVENTOR.
Heinrich Hubert Weber
BY Cornelius Jabuskie
ATTORNEYS.

Patented Dec. 18, 1928.

1,695,832

UNITED STATES PATENT OFFICE.

HEINRICH HUBERT WEBER, OF MASPETH, NEW YORK.

EGG BOILER.

Application filed February 29, 1928. Serial No. 257,997.

This invention is an egg boiler and the object of the invention is to provide a structure of this character which will be unusually simple in construction, efficient and economical to manufacture.

It is the usual practice in egg boilers to provide suitable receptacles for the eggs so that they may be immersed in the boiling water and thereafter removed from the water after the expiration of the desired boiling period. An hour glass is generally employed to time this period. Devices have been heretofore suggested embodying both the hour glass and egg boiling holder, but these structures have invariably been complicated and expensive and require considerable space for their storage when not in use.

The object of the present invention, therefore, is to provide an egg boiler which will have a timing attachment associated therewith in such manner as not to unduly encumber the boiler and so constituted that the whole construction may be collapsed into compacted form for storage when not in use.

Thus in practically carrying out the invention, the device embodies a metal plate, preferably in the form of a die stamping, and which plate is provided with a plurality of depressed seats in which the eggs are adapted to be received and supported. The plate is provided at its center with a handle in the form of a toggle adapted to be collapsed and pivotally associated with the plate so as to be folded down flat when in collapsed condition. The free end of the toggle carries a bracket pivotally secured thereto and on the bracket is rigidly mounted an hour glass holder constructed of some suitable non-heat conducting material. The hour glass is supported within a holder in visible position and the holder is movable on its pivoted connection with the toggle so that it may be swung from one side of the toggle to the other side thereof to invert the hour glass while it is also susceptible of an intermediate position wherein it will extend horizontally across the top of the toggle to permit its holder to function as a non-conductive handle whereby the egg boiler may be manipulated without burning the operator's hands.

The structure is unusually simple, economical to manufacture, and thoroughly efficient in its operations.

Features of the invention, other than those adverted to, will be apparent from the hereinafter detailed description and claims, when read in conjunction with the accompanying drawings.

The accompanying drawing illustrates one practical embodiment of the invention, but the construction therein shown is to be understood as illustrative only, and not as defining the limits of the invention.

Figure 1 is a perspective view showing an egg boiler embodying the present invention.

Figure 2 is a section on the line 2—2 of Figure 1 showing the parts in collapsed positions.

Referring to the drawing, 1 indicates a circular plate, the edge of which is rolled at 2 to provide a finished edge. The plate 1 is preferably sheet metal and is manipulated in suitable dies to form therein depressions 3 constituting seats in which eggs are adapted to be supported. The particular distribution of the depressions are such as to provide for the maximum number of eggs with a minimum diameter of plate 1. In operation, the plate is adapted to be lowered into a body of boiling water and as the circumference of the plate may fit very closely to the wall of the pot, the bases of the depressions 3 are preferably cut out or skeletonized as shown at 4 so that the water may readily rise about the eggs as the plate is lowered into the pot.

Mounted on the center of the plate 1 is a hinge 5 secured to the plate by a rivet 6 or otherwise, and to this hinge is secured a toggle embodying two links 7 and 8 secured together at the elbow of the toggle by a pivot 9. An arcuate slot 10 is formed in the link 8 and a pin 11 is carried by the link 7 and operates in said slot to limit the movement of the link 8 with reference to the link 7.

Mounted on the free end of the link 8 is a bracket 12 which is secured to said link by a pivot 13. This bracket is provided with a right angle flange 14 which is secured to an hour-glass holder 15 by screws 16. The hour-glass holder 15 is made of non-heat conducting material such as fiber or wood. It embodies two side pieces 17 and 18, the former of which is secured to the bracket 12, and end pieces 19 which are secured to and space the side pieces apart. The end pieces are perforated as shown at 21 and the opposite ends of an hour-glass 20 project into these perforations to mount the hour-glass in its holder.

The normal condition of the parts is as shown in full lines in Fig. 1. Here the device is so conditioned as to be ready for employment in the boiling of eggs. After the eggs have been placed in the seats 3, the holder of the hour-glass is moved into the dotted line position of Figure 1, wherein it occupies a substantially horizontal position. The device can then be picked up using the hour-glass holder as a handle and the device thereupon lowered into a pot of boiling water. When the plate is resting on the bottom of the pot, the hour-glass is swung to the right of the toggle and into upright position corresponding to the full line position of Fig. 1, but on the opposite side of the toggle. The boiling operation proceeds and it may be timed by the flowing of the sand through the construction of the hour-glass in the usual manner. When all the sand has passed through the constriction, this ordinarily taking about three minutes, the eggs are finished and the device may be removed. This is accomplished by returning the holder 15 to the dotted line position and employing said holder as a handle.

I wish to call particular attention to the fact that this operation is made possible by employing a non-conductive material in the manufacture of the holder. Such being the case, the holder will remain relatively cool and may be handled without burning the hands of the operator.

After the boiled eggs are removed from the device and it is desired to store the same, the holder is moved into the full line position of Fig. 1 and the toggle is then collapsed, so that the link 8 is moved into a position to overlie the link 7 and in face abutting relation thereto. The link 7 may thereupon be folded down on the hinge 5 into the position of Figure 2, wherein it will be noted that the parts are compacted and may be stored in a minimum space. In practice, the hinge 5 is so constructed that it will constitute a stop against pivotal movement of the link 7 in the opposite direction so that the handle will maintain its upstanding position of Fig. 1 by virtue of the fact that the line of direction of weight is on the stop side of the hinge.

The device is extremely simple in construction. It embodies, in the main, die stamping operations for its manufacture and can thus be commercially produced in a cheap and efficient manner. Moreover, it is thoroughly efficient in the carrying out of its intended functions and its inherent parts are so constituted that the device will last indefinitely.

In the structure as shown in the drawings, provision is made for four eggs, but this number may be increased or diminished in the course of manufacture as may be desired.

The drawings show the invention in its preferred practical form, but the invention is to be understood as fully commensurate with the appended claims.

I wish to call particular attention to the placement of the pockets or depressions 3, the arrangement of which is such as to position the eggs in a holder 1 of minimum diameter. This makes it possible to boil four eggs as shown in a pot of unusually small diameter and in actual practice I have been able to boil eggs with the apparatus as shown in the drawings in a tumbler full of water, thus minimizing gas consumption and rendering the use of the device unusually economical.

Having thus fully described the invention, what I claim as new and desire to secure by Letters Patent is:

1. An egg boiler embodying a plate provided with depressions therein forming seats for eggs, a toggle, one terminal of which is pivotally secured to the center of the plate, a bracket pivotally secured to the other terminal of the toggle, an hour-glass holder secured to the bracket and an hour-glass supported in said holder, the hour-glass holder being constructed of non-heat conducting material and being movable with the bracket from horizontal to vertical position and vice versa on the toggle to function as a handle when in horizontal position and as a timer when in vertical position, and said toggle being foldable at its elbow and at its pivotal connection with the plate to compact the parts of the structure.

2. An egg boiler embodying a plate provided with depressions therein forming seats for eggs, an hour-glass, a holder for said hour-glass, a toggle embodying links pivoted together at the elbow of the toggle, means for pivotally connecting one terminal of the toggle to the center of the plate, and means for pivotally connecting the other end of the toggle to the hour-glass holder.

3. An egg boiler embodying a plate provided with depressions therein forming seats for eggs, said depressions being provided with openings through which water is adapted to flow, a toggle, one terminal of which is hinged to the center of the plate, a bracket pivoted to the other terminal of the toggle, an hour-glass holder of non-conductive material mounted on the bracket for pivotal movement therewith on the toggle, and an hour-glass supported in said holder.

In testimony whereof I have signed the foregoing specification.

HEINRICH HUBERT WEBER.